US010830597B2

(12) United States Patent
Hans et al.

(10) Patent No.: US 10,830,597 B2
(45) Date of Patent: Nov. 10, 2020

(54) SMART CITY CROSSWALK AND TRAFFIC NAVIGATION SYSTEM

(71) Applicant: International Business Machines Corporation, Armonk, NY (US)

(72) Inventors: Theresa Hans, Poughkeepsie, NY (US); Ann Novelli, Wappingers Falls, NY (US); Christopher Robbins, Monroe Township, NJ (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 15/801,622

(22) Filed: Nov. 2, 2017

(65) Prior Publication Data

US 2019/0128681 A1 May 2, 2019

(51) Int. Cl.
*G01C 21/34* (2006.01)
*G01C 21/36* (2006.01)
(Continued)

(52) U.S. Cl.
CPC ..... *G01C 21/3415* (2013.01); *G01C 21/3492* (2013.01); *G01C 21/3614* (2013.01);
(Continued)

(58) Field of Classification Search
CPC ............ G01C 21/3415; G01C 21/3492; G01C 21/3614; G06F 16/29; G06F 16/9537; G06F 3/0488; G06F 3/0482
See application file for complete search history.

(56) References Cited

U.S. PATENT DOCUMENTS

| 8,738,291 B2 | 5/2014 | Ford et al. |
| 9,217,648 B2 | 12/2015 | Huck et al. |

(Continued)

FOREIGN PATENT DOCUMENTS

| CN | 103236176 B | 6/2016 |
| JP | 08202982 A | 8/1996 |
| JP | 2013186051 A | 9/2013 |

OTHER PUBLICATIONS

Anagnostopoulos et al., "Cyclist-Aware Traffic Lights through Distributed Smartphone Sensing," Pervasive and Mobile Computing 31 (2016), pp. 1-20.

(Continued)

*Primary Examiner* — Rami Khatib
(74) *Attorney, Agent, or Firm* — Brian D. Welle

(57) ABSTRACT

A user input that includes a final destination and one or more user criteria is received. One or more available paths that satisfy the one or more user criteria are determined by utilizing mapping data. The one or more available paths are displayed within an electronic device. A user selection of a desired path of the one or more available paths is displayed. The user-selected desired path is displayed within a user interface. Traffic data and user data are monitored. A routing event is detected based on monitoring the traffic data and the user data. One or more new paths that satisfy the criteria are generated, based on the monitored traffic data and user data. A user is prompted to select one of the one or more generated new paths. A user selection of at least one of the one or more generated new paths is received.

20 Claims, 11 Drawing Sheets

(51) Int. Cl.
  *G06F 16/29* (2019.01)
  *G06F 16/9537* (2019.01)
  *G06F 3/0488* (2013.01)
  *G06F 3/0482* (2013.01)

(52) U.S. Cl.
  CPC .......... *G06F 16/29* (2019.01); *G06F 16/9537* (2019.01); *G06F 3/0482* (2013.01); *G06F 3/0488* (2013.01)

(56) References Cited

U.S. PATENT DOCUMENTS

| | | | |
|---|---|---|---|
| 9,349,293 B2 | 5/2016 | Beaurepaire et al. | |
| 2010/0312466 A1* | 12/2010 | Katzer | G01C 21/3492 701/533 |
| 2011/0037618 A1* | 2/2011 | Ginsberg | G08G 1/096775 340/905 |
| 2014/0335897 A1 | 11/2014 | Clem et al. | |
| 2016/0004906 A1 | 1/2016 | Nerayoff et al. | |
| 2016/0049079 A1 | 2/2016 | Ibrahim et al. | |
| 2016/0110998 A1 | 4/2016 | Todasco | |
| 2016/0195407 A1* | 7/2016 | Sasaki | G08G 1/0962 701/36 |
| 2016/0203717 A1* | 7/2016 | Ginsberg | G08G 1/07 701/117 |
| 2016/0356613 A1* | 12/2016 | Hajj | G06F 3/0485 |
| 2017/0069208 A1* | 3/2017 | Nair | G01C 21/3415 |
| 2017/0184411 A1* | 6/2017 | Glasgow | G01C 21/3415 |
| 2018/0061230 A1* | 3/2018 | Madigan | G08G 1/08 |
| 2018/0209801 A1* | 7/2018 | Stentz | G05D 1/0274 |
| 2019/0221115 A1* | 7/2019 | Masuike | B60R 21/00 |
| 2019/0257661 A1* | 8/2019 | Stentz | G08G 1/20 |

OTHER PUBLICATIONS

IBM, "System and Method to Reduce Vehicle Stoppage through Navigational Improvements," An IP.com Prior Art Database Technical Disclosure, IPCOM000186232D, Aug. 13, 2009, 6 pgs.

Joo et al., "A New Route Guidance Method Considering Pedestrian Level of Service using Multi-Criteria Decision Making Technique," J Korea Spatial Information Society 19.1 (2011): 83-91.

Mell et al., "The NIST Definition of Cloud Computing," Recommendations of the National Institute of Standards and Technology, U.S. Department of Commerce, Special Publication 800-145, Sep. 2011, 7 pgs.

Maryland Department of Transportation, "Pedestrian Flow Modeling for Prototypical Maryland Cities," http://smartgrowth.umd.edu/assets/cliftondaviesallenraford_2004.pdf, pp. 1-123, Nov. 2004.

Schaefer et al., "Smarter Cities Series: Understanding the IBM Approach to Traffic Management," Redguides for Business Leaders, pp. 1-24, © IBM 2011.

* cited by examiner

US 10,830,597 B2

SMART CITY CROSSWALK AND TRAFFIC NAVIGATION SYSTEM

BACKGROUND

The present invention relates generally to the field of data processing, and more particularly to utilizing a map database system for determining route correction, modification, or verification.

Web mapping is a process of utilizing geographic locations in the form of a map that were delivered by geographic information systems. A web map that may be delivered via the internet may be delivered to a consumer, and is a service that consumers may utilize to view or obtain addresses or geographic locations, as well as directions to the addresses. Web geographic information systems can emphasize geographical data processing aspects involved with design aspects such as data acquisition and server software architecture, such as data storage and algorithms.

SUMMARY

Embodiments of the present invention disclose a method, computer program product, and system for dynamically determining a traffic route based on traffic data. A traffic route based on traffic data and one or more user criteria is dynamically determined. A user input that includes a final destination is received. One or more available paths that satisfy the one or more user criteria are determined by utilizing mapping data. The one or more available paths are displayed within an electronic device. A user selection of a desired path of the one or more available paths is displayed. The user-selected desired path is displayed within a user interface. Traffic data and user data are monitored. A routing event is detected based on monitoring the traffic data and the user data. One or more new paths that satisfy the one or more user criteria are generated in response to detecting the routing event, based on the monitored traffic data and user data. A user is prompted to select one of the one or more generated new paths. A user selection of at least one of the one or more generated new paths is received.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
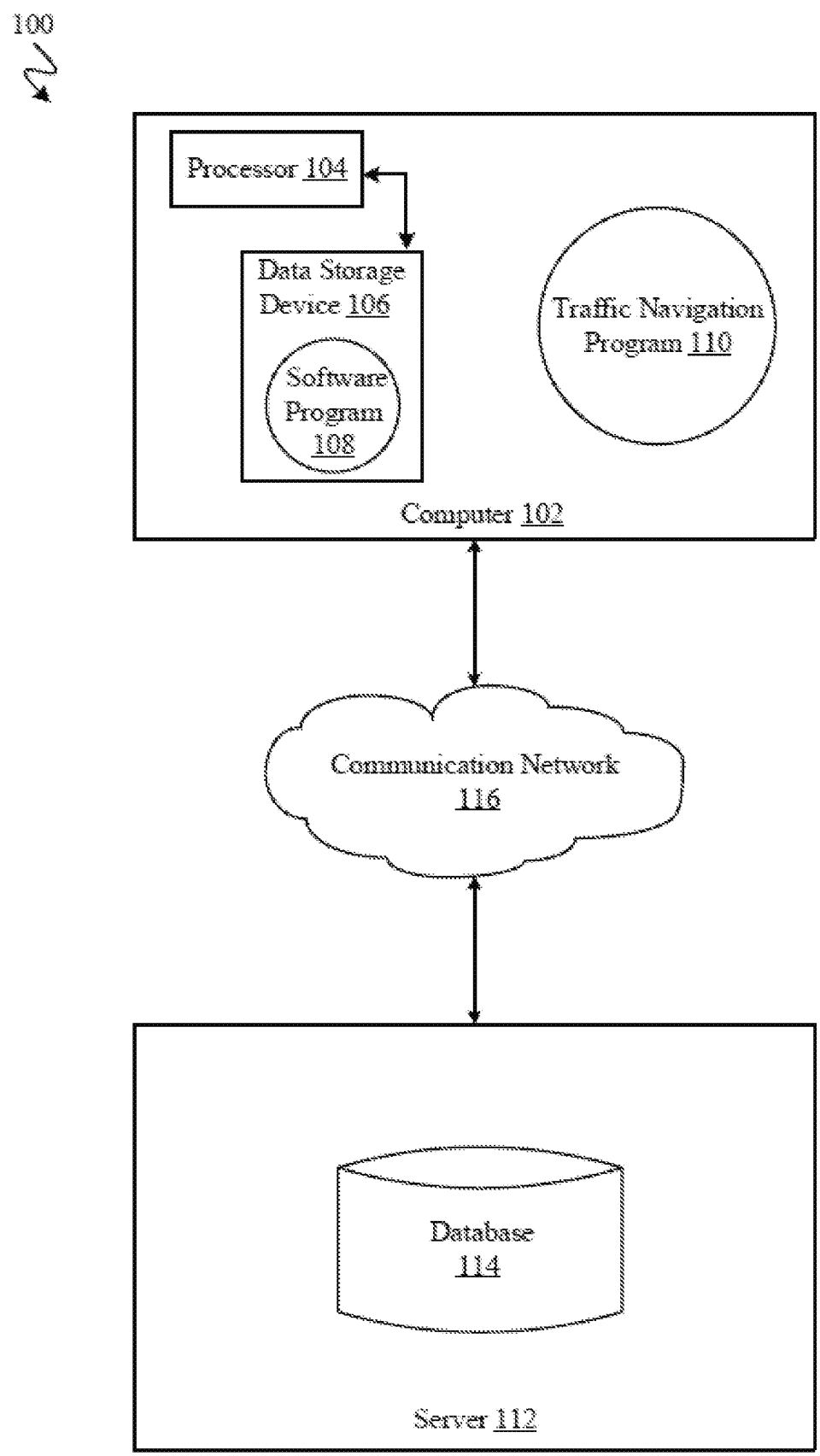
FIG. 1 illustrates a networked computer environment, according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Currently, there is no way for pedestrians to know the schedules of traffic lights and crosswalks in their city. This can be frustrating as it extends travel time when walking to work or interrupts runners who must stop at red lights during travel. There is no way for a pedestrian to plan out his or her route ahead of time in a way that would avoid the most stoppage or adjust mid-route as his or her pace changes.

Therefore, it may be advantageous to implement a method, system, and computer program product that obtains user input regarding a desired destination, path, goal pace, and type of travel (e.g., walking, running, bicycling, vehicle, etc.); utilizes existing mapping data and navigation technologies to determine one or more available paths; identifies traffic signals along the desired destination; accesses real-time (e.g., from a Smart City database) traffic data (e.g., traffic signal timing and/or status); calculates a time of user encounter with first crossing based on the goal pace; determines start time; updates the traffic data when the user crosses a street; and, recalibrates a user pace and/or location of a next street crossing in response to the user crossing the street—until the user reaches her desired destination.

The proposed invention can build upon existing technologies—such as IBM® Smarter Cities (IBM Smarter Cities and all IBM Smarter Cities-based trademarks and logos are trademarks or registered trademarks of International Business Machines Corporation and/or its affiliates), Internet of Things (IoT), and smart device technologies—to dynamically map routes through city streets that avoid or synchronize encounters with traffic signals, such that pedestrians using embodiments of the present disclosure will not have to wait at crosswalks and interrupt their progress. The Smarter Cities initiative is a metropolitan development initiative that integrates the IoT with information and communication technology (e.g., social media, information on the Internet, traffic data, etc.) and cognitive capabilities (e.g., natural language processing and/or analytical software) in order to manage a city's assets. In some embodiments, the Smarter Cities initiative may access real-time and/or historical traffic data, and then utilize cognitive capabilities along with analytical software techniques, in order to determine an available path that circumvents traffic (e.g., any populated areas, red lights, and the like). For example, embodiments of the present disclosure may extract information from one or more users connected to a Smarter Cities platform that includes such information as events in a proximity to the user, pictures uploaded that may include traffic information, or GPS information of the users. Embodiments of the present disclosure may utilize cognitive capabilities and analytical software techniques to determine where the events are located, where there may be an increased number of people within an area, and/or the real-time traffic statuses.

Real-time traffic signal timing and state information may be combined with a user's smart device (e.g., a smart phone, laptop, tablet, or the like) GPS and accelerometer data (obtained through an accelerometer embedded in the user's smart device), to determine when crosswalk signals will permit the user to cross streets in the places and directions required to navigate to a given destination or follow a certain route without having to wait. If needed, variations in the route or pace can be used to achieve a correct timing. For example, recommending crossing a street some number of intersections later, or recommending slight pace changes to the user can help achieve correct timing. Embodiments of the present disclosure may further sense a current pace by way of the accelerometer data or GPS data, and reroute the user in real-time based on when she would hit green lights at intersections, allowing for uninterrupted travel. Embodiments of the present disclosure may also use this information to suggest a time when the user should leave for a run to allow for minimal stoppage, based on her intended pace.

It is to be understood that the aforementioned advantages are example advantages and should not be construed as limiting. Embodiments of the present disclosure can contain all, some, or none of the aforementioned advantages while remaining within the spirit and scope of the present disclosure.

Referring to FIG. 1, an exemplary networked computer environment 100 in accordance with at least one embodiment is depicted. The networked computer environment 100 may include a computer 102 with a processor 104 and a data storage device 106 that is enabled to run a software program 108 and a traffic navigation program 110. The networked computer environment 100 may also include a server 112 that includes a database 114 and can communicate over a communication network 116 with the computer 102. The networked computer environment 100 may include one or more computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116.

The communications network 116 may include connections, such as wire, wireless communication links, or fiber optic cables. As will be discussed with reference to FIG. 9, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the traffic navigation program 110 may interact with a database 114 that may be embedded in various storage devices, such as, but not limited to a computer/mobile device 102, a networked server 112, or a cloud storage service. The database 114 can include a repository of any transactions associated or initiated with the traffic navigation program 110. The traffic navigation program 110 may be updated in any system associated with the traffic navigation program 110 (e.g., database 114).

According to the present embodiment, a user using a client computer 102 may use the traffic navigation program 110 that receives user-input, that provides directions on how to reach a desired destination with uninterrupted traffic stops (or fewer interruptions), and then dynamically displays the desired path within a GUI. The traffic navigation method is explained in more detail below with respect to FIGS. 2 through 8.

Figure 2:
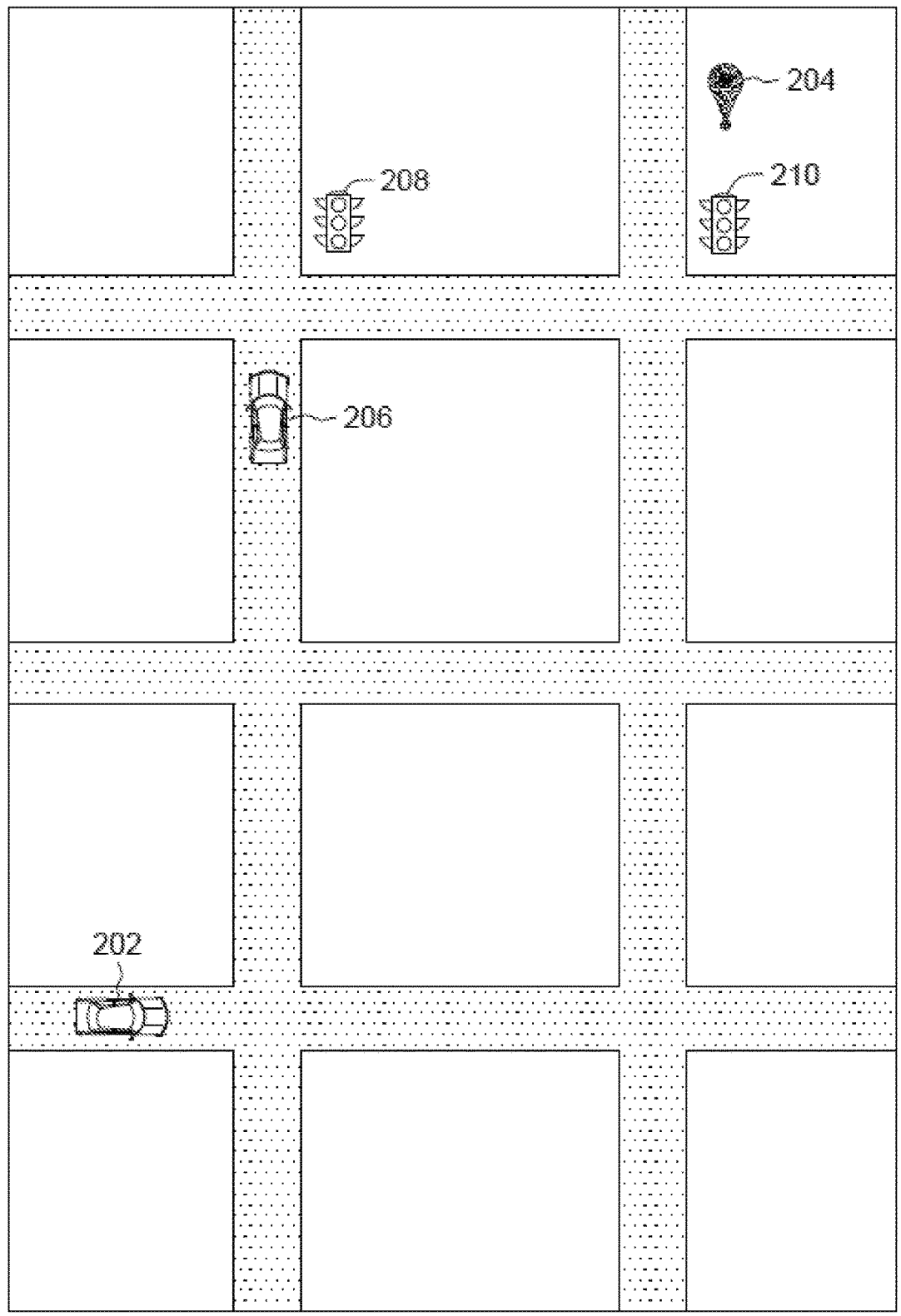
FIG. 2 illustrates a top view of a car circumventing traffic, according to at least one embodiment.

Referring now to FIG. 2, a traffic diagram 200 illustrating a street grid that includes a first vehicle 202 that is heading towards a destination 204, a second vehicle 206 stopped at an intersection that is governed by a first streetlight 208, and a second streetlight 210 that is located near the destination 204. While the example illustrated and described with respect to FIG. 2 involves the routing of a vehicle, it is to be understood that similar principles may be used to determine a route for a pedestrian.

In some embodiments, the first vehicle 202 may transmit traffic data, such as geolocation data, to the traffic navigation program 110, and may include a first user who is operating the first vehicle 202 and who is using the traffic navigation program 110. The first user may have submitted the destination 204 to a processor (e.g., a processor running the traffic navigation program 110 shown in FIG. 1), and the processor may process related information (e.g., the statuses of both the first traffic light 208 and the second traffic light 210, locations of stop signs within a proximity between the first vehicle 202 and the destination 204, pedestrian traffic, etc.) stored within a data repository (such as, database 114) to a first vehicle 202 and the surrounding environment to determine a path to the destination 204. The second vehicle 206 may also transmit traffic data, such as geolocation data and/or user-submitted data (e.g., the state of the traffic light, pedestrian data, etc.) that was observed by the user.

A second user, who may be operating and located within the second vehicle 206 who is stopped at the first stoplight 208, may submit to the processor that the status of first stoplight 208 displaying a red light, as a status update. In some embodiments, the processor may automatically determine the status of the first stoplight 208 based on sensor data within the second vehicle 206 (e.g., sensor data from a smartphone in the first car, or from sensors in the car itself). For example, if the second vehicle 206 is not moving, the processor may determine that the first stoplight 208 is red.

The processor may receive additional submitted data from a pedestrian (not shown) who is located near the second stoplight 210 that includes information relating to the status of the second stoplight 210. As with the second vehicle 206, in some embodiments, the processor may automatically determine the status of the second stoplight 210 based on sensor data received from the pedestrian (e.g., sensor data from the pedestrian's smartphone or smartwatch). For example, if GPS data indicates that the pedestrian is in the middle of the road and/or accelerometer data shows the pedestrian to be crossing the street, the processor may determine that status of the second stoplight to be stopping traffic from traveling along the road being crossed.

The processor may determine that the first vehicle 202 may take a path that circumvents the first stoplight 208 and directs the first vehicle 202 to reach the second stoplight 210 while the second stoplight 210 is green. The processor may then determine that since the first light 208 is red, the quickest path from the current location of the first vehicle 202 to the destination 204 is to circumvent the first stoplight 208, and so the processor may determine the quickest path to the destination 204 is to continue in the same direction for two blocks and then make a left, continuing two blocks, past the second stoplight 210 that is green, until reaching destination 204. The geolocation data of the first vehicle 202 collected by the processor may be used to determine paths for any other vehicles (not shown) within a proximity (e.g., one mile, five-hundred feet, etc.) of the first vehicle 202, or any other vehicle that may intersect with any streetlight or path that the first vehicle 202 may have driven past or near. The determined paths may be displayed within a user interface, e.g., GUI of a client device, as discussed in more detail with respect to FIGS. 3 through 8.

Figure 3:
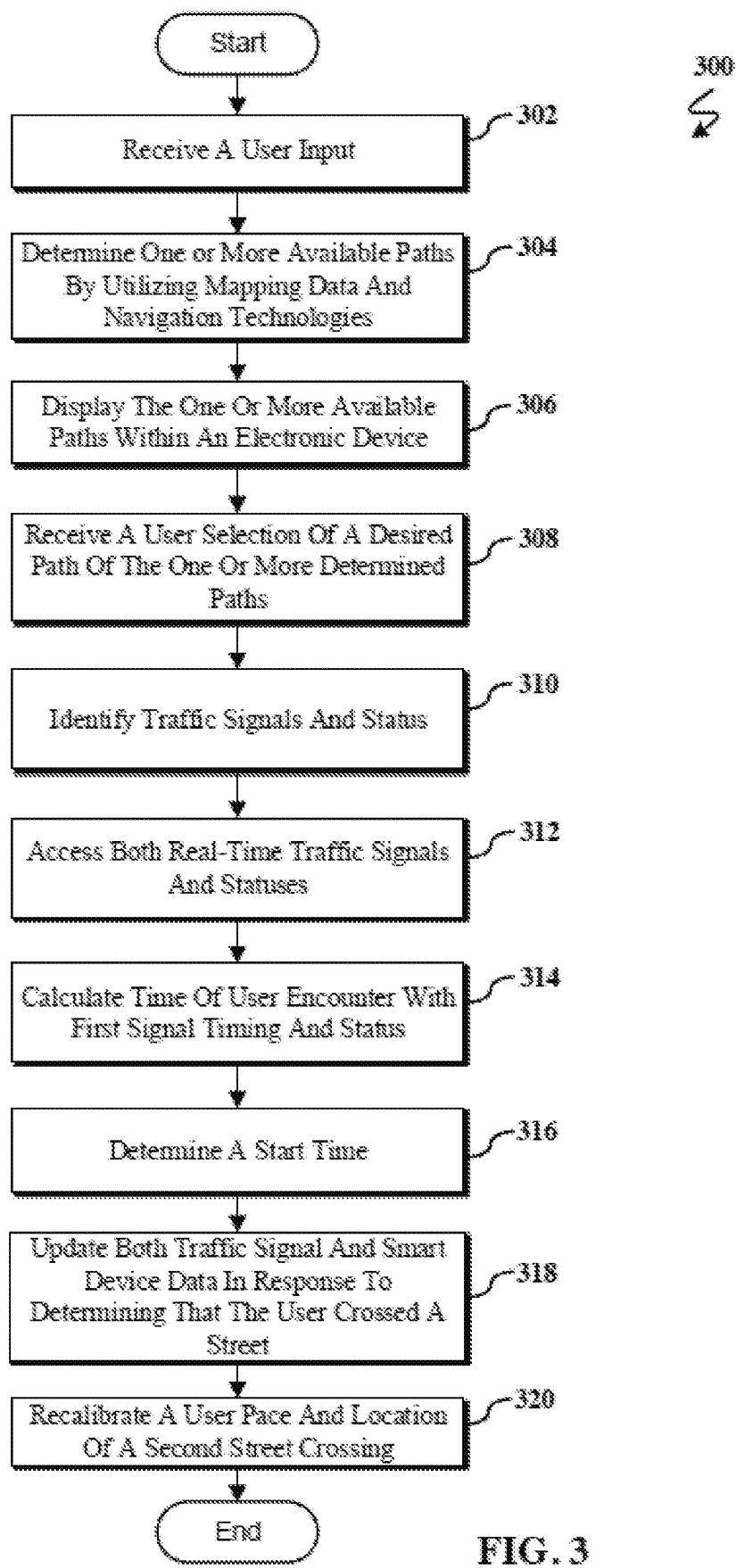
FIG. 3 illustrates an operational flowchart illustrating an example path determination process by a traffic navigation program, according to at least one embodiment.

Referring now to FIG. 3, an operational flowchart illustrating an exemplary dynamic traffic navigation process 300 (e.g., executed by a processor running the traffic navigation program 110 shown in FIG. 1) according to at least one embodiment is depicted. At 302, the processor receives user input. The received user input may be list of items that includes a desired path (e.g., the names of any streets that the user may want to traverse or buildings that the user may want to see while traveling), a goal pace (e.g., a desired travel speed), and a type of travel (e.g., walking, running, bicycling, vehicle, etc.). The user input may also include an instruction that the user would like to go sightseeing while on the desired path along with a desired destination time (e.g., thirty minutes). The user input may also include a request from the user to avoid any red lights while on the desired path. Additionally, in some embodiments, the user input may include tags associated with an account that the user has logged into that may trigger the processor to retrieve any information (e.g., historical preferences, historical data, previously selected desired paths, etc.) associated with the user account.

The received data may be recorded by the processor into a data repository (e.g., database 114). The processor may record the received input as a single count in a table or list designating the desired path and any associated data as tagged to the user. The table or list stored in the database 114 may include rows and columns. The columns may include a first row for the desired path and any associated data and a second row for the user's historical preferences. In some embodiments, the desired path and any associated data may include, but is not limited to, a timestamp of when the received input was received. The historical preferences may include, e.g., any historical user data that was received within a time interval (e.g., five minutes) within the timestamp and any historical data of a previously determined desired paths that were within a proximity (e.g., a mile, five-hundred feet, etc.) of a current location of the user or within a location of the desired destination.

At 304, the processor determines one or more available paths for the user to traverse. The determined path may be based on utilizing existing mapping data and navigation technologies according to the received user input. For example, in some embodiments, the processor may access existing mapping data, such as GPS data stored on the user's electronic device or any relevant information included in the Smarter Cities platform and use a pathfinding algorithm to determine one or more available paths that satisfy the requirements of the user. The mapping data may include data points relating to a visual representation of streets, roads, freeways, buildings (e.g., houses, restaurants, etc.), historical locations. The processor may access navigation technologies that may have been utilized by the user, such as common map navigation technologies, Smarter Cities, electronic representations of maps, or the like.

At 306, the processor displays the one or more available paths (e.g., in the form of geographical images) within the electronic device for the user to select a desired path. Each of the geographical images may include a list that includes: a total time to destination, a likelihood (e.g., a percentage) that the user will not be stopped at any red lights, and/or one or more popular destinations (e.g., restaurant, museum, historical landmark, and/or the like) that the user may stop by, which may be aided by accessing historical travel data or user preferences that may be stored within the electronic device. Additionally, the one or more determined paths may each have one or more approximate start times that the user may begin the path so that the user does not stop at any red lights, which may be useful for the user to consider so that he may plan to arrive at his desired destination. The one or more approximate start times may have been determined based on historical data.

At 308, the processor receives a user selection of the desired path of the one or more determined paths. The user selection can be in the form of the user touching the proximity of the graphical image of the desired path within the GUI, an auditory command, or the like. At 310, the processor identifies traffic signals along the user selected desired path. At 312, the processor accesses both real-time traffic data and statuses of the identified traffic signals. The real-time traffic data may be the time between a red light and a green light, and a green light and a yellow light, and a red light. The statuses of the identified traffic signals may be which particular color the light is (e.g., green, yellow, or red). The processor may then use this data to determine if a user would be stopped at a red light at any particular point within his desired path.

At 314, the processor calculates a time when the user may encounter a first traffic signal along the desired path. The time may be calculated based on received user-movement data from instrumental devices (e.g., accelerometer, gyroscope, GPS data, etc.) embedded within the electronic device. The calculation may be performed by executing any number of commonly known equations that may determine the speed, acceleration, and/or direction of the user as he approaches the first traffic signal. For example, assuming that the user is walking in parallel with the street towards the first street at five miles per hour that is located a distance of five hundred feet away, the time to the first street may be at the first street in a minute and fifteen seconds. The user-movement data may be continuously collected from the instrumental devices by the processor. This may prove useful if/when the user was to stop, or change his direction or pace.

At 316, the processor determines a start time for the user to begin on their desired path. The start time may be based on the received user input (e.g., the time the user desires to be at his desired location, and any points of interest that he may wish to stop at, the user pace, mode of transportation, etc.). The start time may also include a likelihood that the user will arrive at the desired location. The likelihood may in the form of a percentage, or may be a margin of error (e.g., five minutes) that the user is likely to fall within if he begins at a certain time. The likelihood may be in the form of a statement to the user, indicating that there is a fifty percent chance that the user will be at his desired location within thirty minutes, there is a fifty percent chance that the user will be within a five minutes' error of his desired arrival time, or the like.

At 318, the processor updates both the real-time traffic data of the identified traffic signals and smart device data in response to a routing event (e.g., in response to determining that the user has crossed a first street, a change in a traffic light's status, a crash, the user straying from the route, change in pace, the user staying in a single place for a predetermined amount of time, an emergency vehicle in a proximity of the user, etc.). The processor may have determined that the user has crossed the first street based on received GPS data. The real-time traffic data and smart device data may be updated once the user has either turned onto a second street that may be substantially perpendicular to the first street, or begun traversing a crosswalk. At 320, the processor recalibrates the user pace to determine a new pace of the user and geographic location of a second street crossing based on analyzing accelerometer and gyroscopic data. The recalibration of the user pace and the geographic location may be in response to the user beginning to traverse the second street after he has turned onto the second street, or when he has finished traversing the crosswalk.

For simplicity, the discussion may include embodiments of the present disclosure being utilized by a user operating or within a vehicle, even though a user who is going for a run or walk may utilize embodiments of the present disclosure in a substantially similar way. In some embodiments, the traffic navigation program 110 may be implemented with respect to a user operating a vehicle in a substantially similar way as to what was described with respect to FIG. 3, or the user may be going for a walk, run, or the like. For example, the processor may receive user input transmitted by a user operating (or a passenger within) a vehicle. The processor may determine one or more available paths for the vehicle to traverse by utilizing mapping data and navigation technologies. The processor may then display the one or more available paths within an electronic device, such as a smart phone, tablet, laptop, smart TV, cellular device, automated system integrated into the vehicle, or the like. The processor may then receive a user selection of a desired path of the one or more desired paths to traverse. The processor may identify traffic signals and the status of any traffic lights. The processor may then access both real-time traffic signals and statuses of the traffic lights. The processor may then calculate a time that the vehicle may arrive at the first traffic light and the status of the traffic light. The processor may then determine a start time for the user to begin driving the vehicle along the desired path. The processor may then update both traffic signal and smart device data in response to determining that the user is stopped in the vehicle at the stoplight. The processor may then recalibrate the vehicle's speed, acceleration, and/or location of the vehicle, as well as a predetermined location of the vehicle at the next stoplight.

Figure 4:
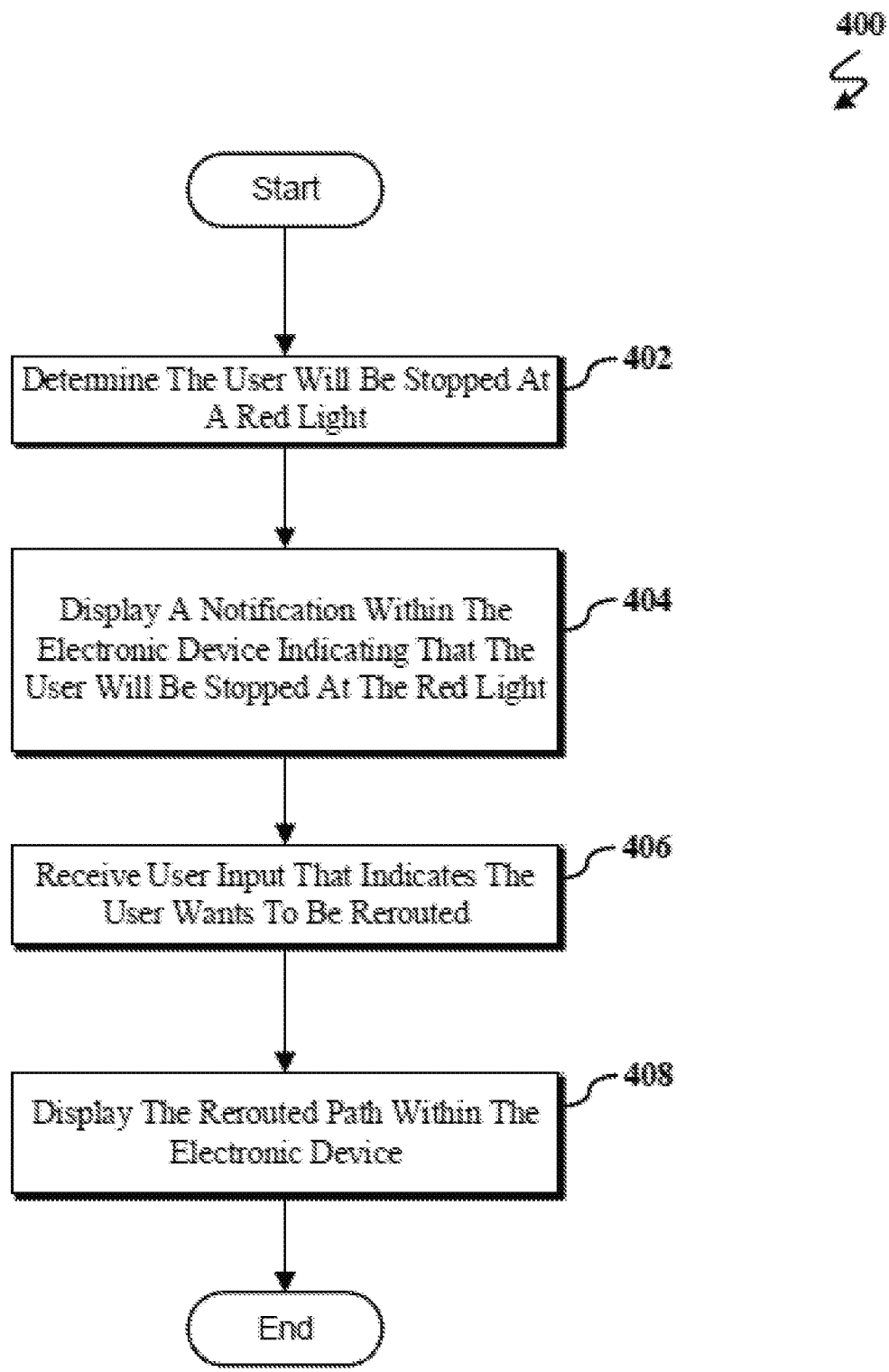
FIG. 4 illustrates an operational flowchart illustrating an example alternate route generation process by a traffic navigation program, according to at least one embodiment.

Referring now to FIG. 4, an operational flowchart illustrating an exemplary dynamic rerouting process 400 (e.g., executed by a processor running the traffic navigation program 110 shown in FIG. 1) according to at least one embodiment is depicted. At 402, the processor determines that the user will be stopped at a red light. The processor may make the determination based on collected accelerometer data, gyroscopic data, GPS data, the user-movement data, and/or data sent in from other users in a nearby proximity to the stoplight that will be red. For example, the processor may have collected traffic data that included the status of a stoplight that at the time of collecting the traffic data was yellow and the stoplight will have turned red by the time that the user is at the stoplight. According to another example, the processor may receive user submitted data or geolocation data from another user who is utilizing the traffic navigation system 110. The geolocation data may have indicated that the other user is slowing down and headed in a direction that is located on the other side of the street, so the user must be slowing down due to the stoplight changing from yellow to red.

At 404, the processor displays a notification within the electronic device, such as a smart phone, tablet, laptop, cellular device, or the like, indicating that the user will be stopped at a red light. The displayed notification may include a list of one or more rerouted paths and may further include an option to select anyone of the rerouted paths. Each of the displayed rerouted paths may include the following: an estimated arrival time, a list of attractions along the rerouted path, a likelihood of being rerouted again, etc. The display may be depicted in a substantially similar way as described with reference to FIG. 3 and/or as will be shown in FIG. 6.

At 406, the processor receives user input that indicates the user wants to be rerouted. The received user input may be a selection of one of the one or more available rerouted paths. In some embodiments, the user may select, by clicking, giving an auditory command, or the user touching an area within a touch-screen display of the electronic device that is displaying the user-selected rerouted path. At 408, the processor displays the rerouted path within the electronic path. The rerouted path may be depicted in a substantially similar way as will be shown in FIG. 8, at which point the dynamic rerouting process 400 may conclude.

Figure 5:
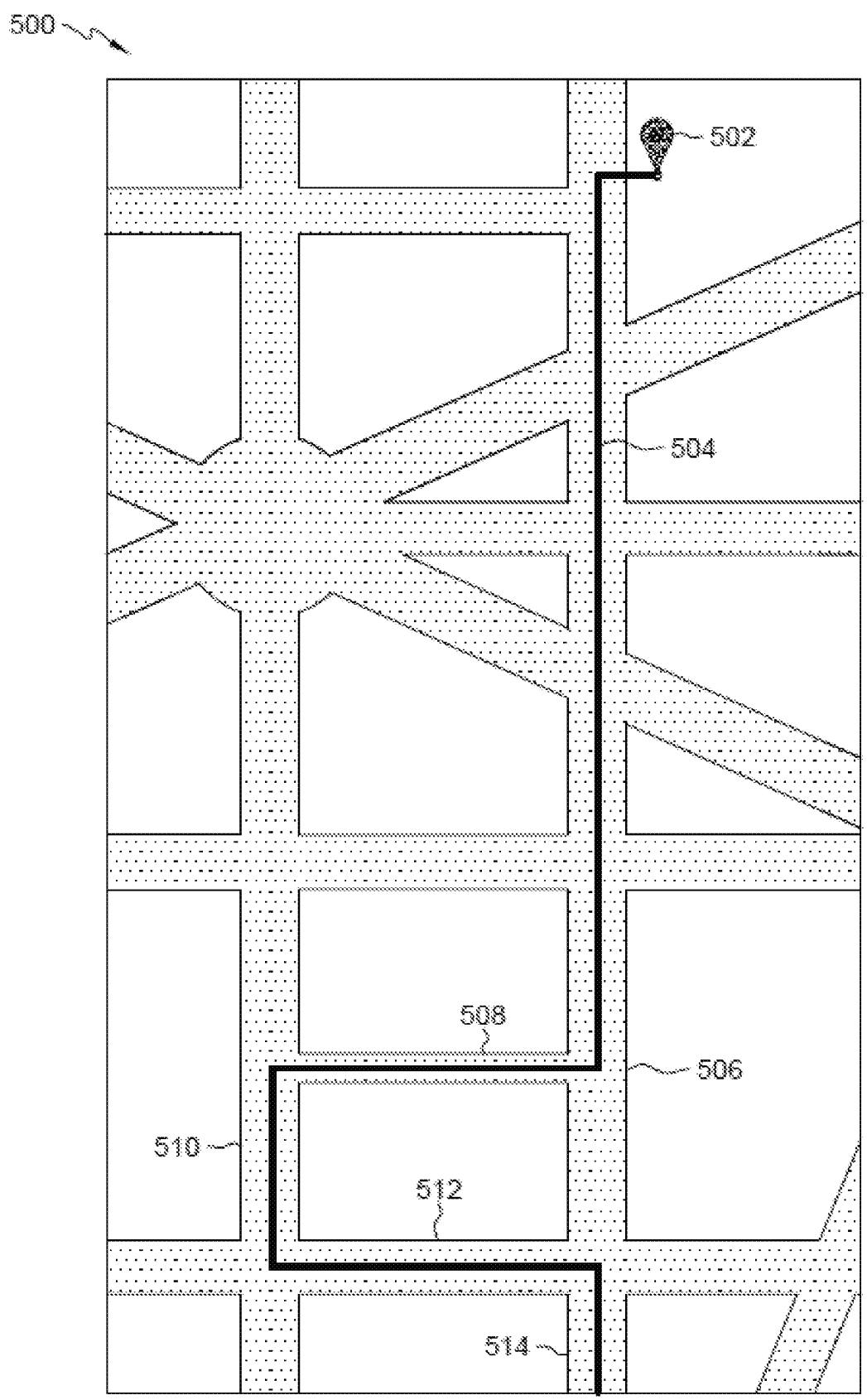
FIG. 5 illustrates an exemplary GUI displaying a map that highlights a determined route, according to at least one embodiment.

FIG. 5 illustrates an exemplary desired path displayed within a GUI 500, in accordance with embodiments of the present disclosure. The GUI 500 includes a starting point 502 that the user is starting along his path 504 to a destination (not shown). The path can include one or more streets that the user may traverse in order to reach his destination, including street 506, street 508, street 510, street 512, and street 514. The one or more streets: 506-514 may have been selected in order for the user to circumvent any red lights so that the user may not have to stop during his travel along the path 504.

Figure 6:
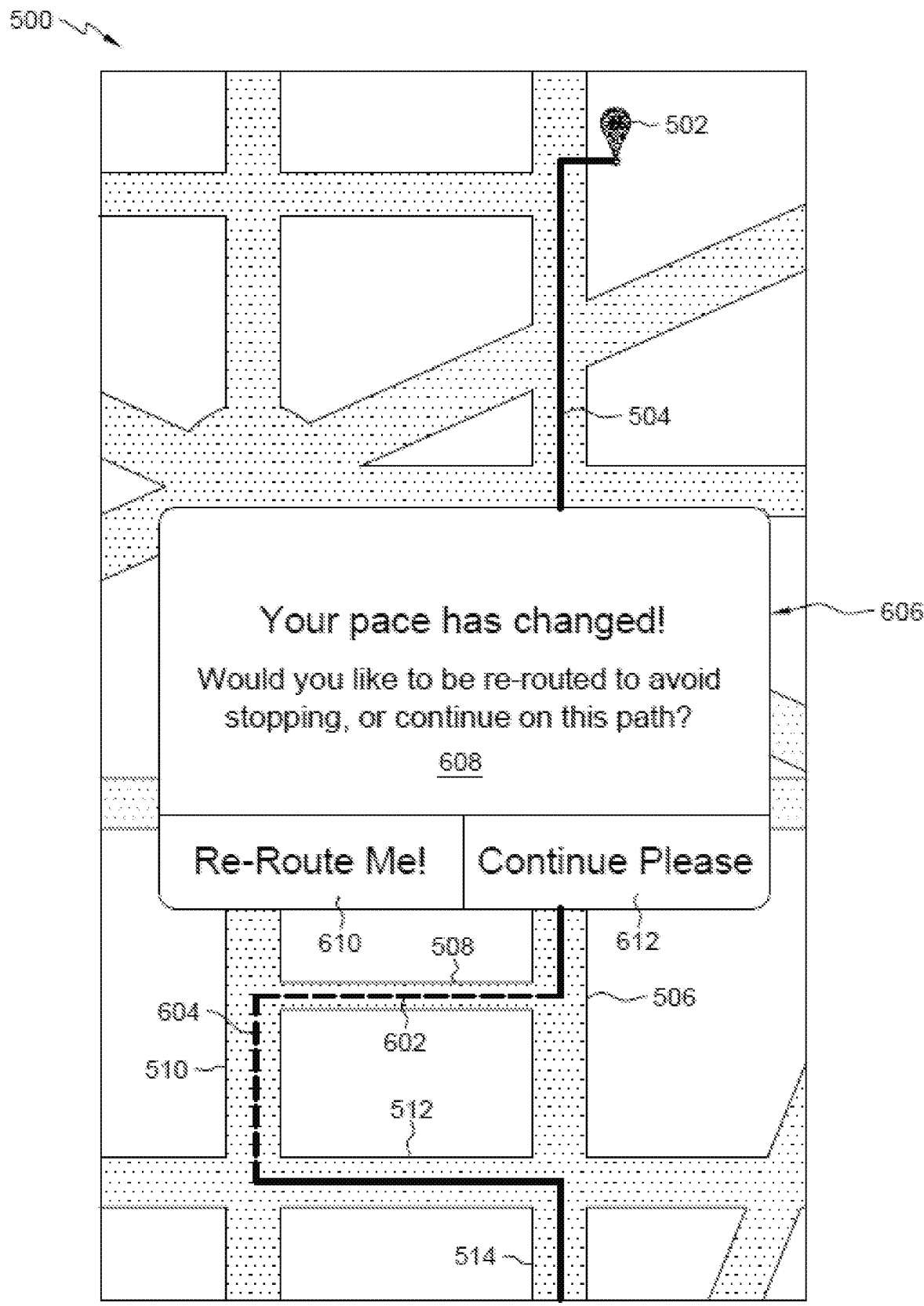
FIG. 6 illustrates the exemplary GUI displaying a notification of an alternate path, according to at least one embodiment.

FIG. 6 illustrates an exemplary desired path that includes an option for the user to be rerouted that is displayed within the GUI 500, in accordance with embodiments of the present disclosure. The rerouting may have been caused by stoplights (not shown) along the path 504, specifically at or near street 508 and street 510 that changed to red. This would result in a portion of the path 504 (portion 602 and portion 604) causing a delay in the user's travel, due to stopping at stoplights. For example, the user's pace may have changed. As a result, one or more lights that were going to be green when the user reached them at her old pace may not be expected to be red when the user arrives. Accordingly, the processor may determine that a rerouted path may better satisfy the user's request (e.g., be quicker, have fewer stops, arrive at a specific time, etc.).

The display 606 includes an indication with a note that states, "Your pace has changed!" as shown in block 608, along with a "Re-Route Me!" option 610, and a "Continue Please" option 612. The option 610, if the user selects this option, may provide the user with at least one alternate path for the user to traverse, such that the user will not have to stop at a red light along the alternate path. The option 612, if the user selects this option, may leave the GUI 500 to display the current path that the user is currently travelling on. If the user selects option 612, the option 610 may be displayed in a corner of GUI 500 so that the user may have the option at any time along the path 504 to re-route their current path.

Figure 7:
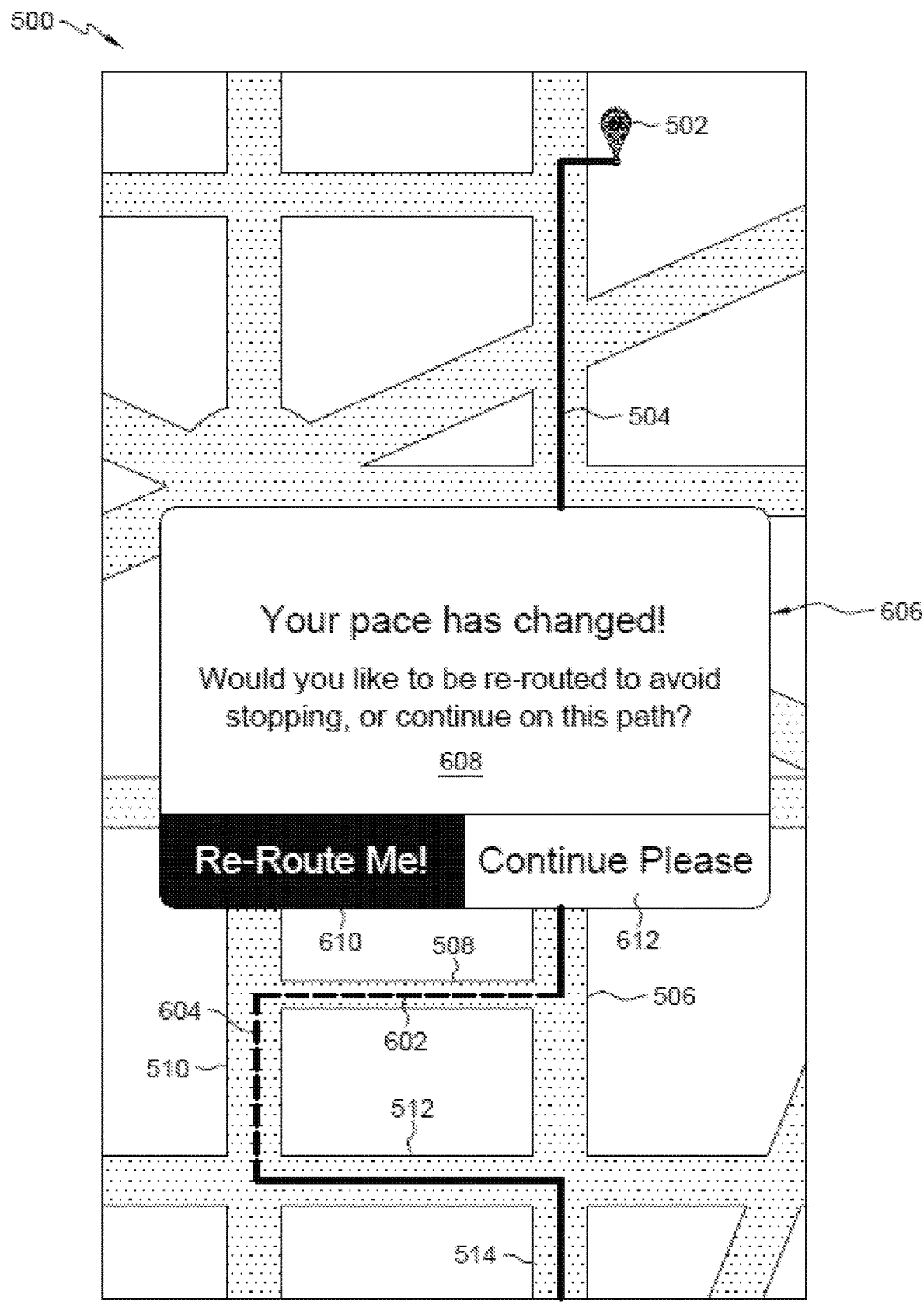
FIG. 7 illustrates the exemplary GUI displaying a user selection of the alternate route, according to at least one embodiment.

FIG. 7 illustrates an exemplary desired path that includes a user selection to reroute the desired path that is displayed within the GUI 500, in accordance with embodiments of the present disclosure. The GUI 500 includes display 606, the notification 608, option 610, and the option 612, all of which was displayed in response to the user who was starting at starting point 502 along a path 504, traversing streets 506-514, with both portions 602 and 604 that may have caused the user to be delayed due to red lights. The user may have selected the "Re-Route Me!" option 610 that may cause one or more alternate paths to be displayed within the GUI 500. The user may have selected the option 610 by touching a physical portion of the screen that the option 610 occupies, an auditory command to select option 610, etc.

Figure 8:
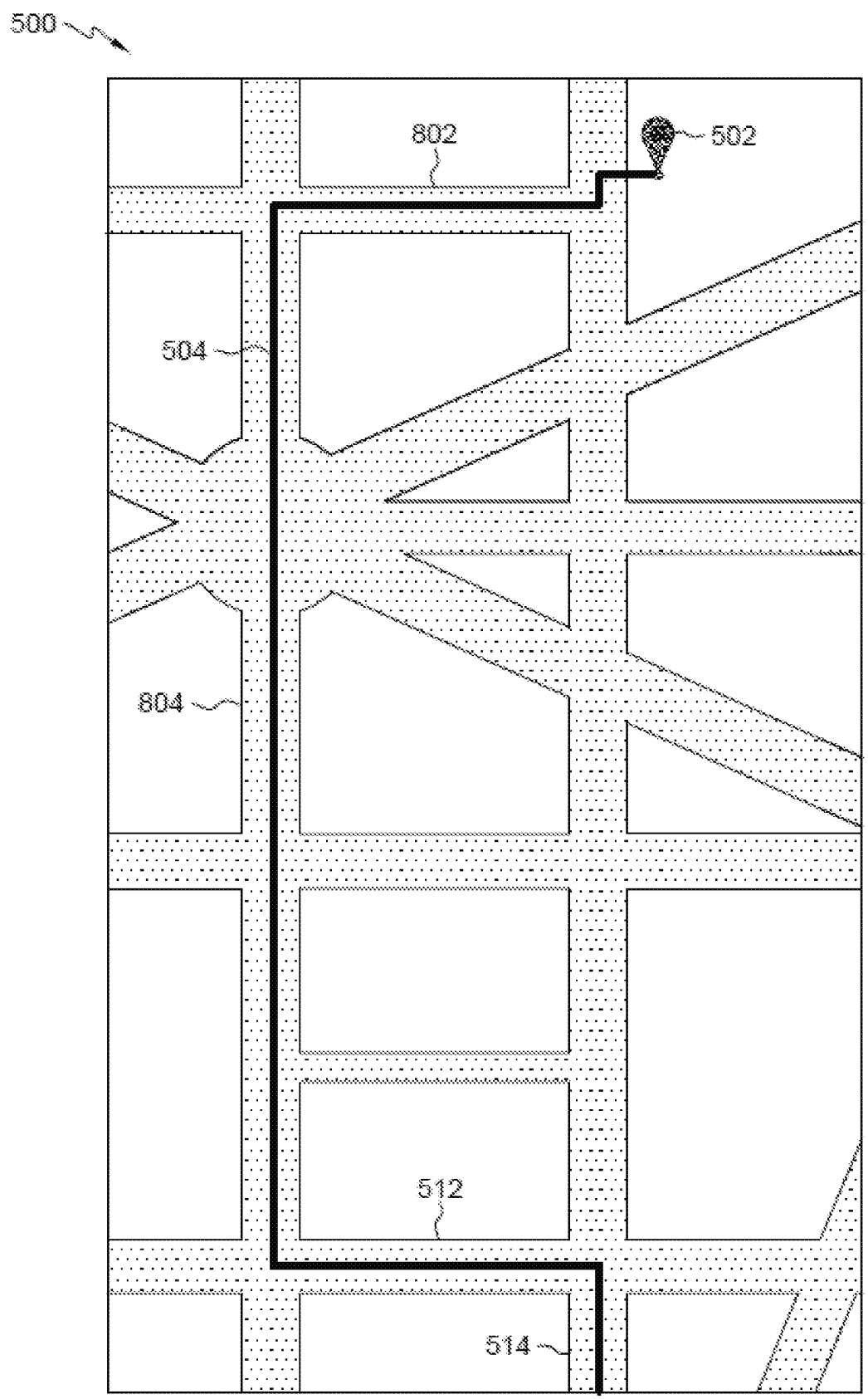
FIG. 8 illustrates an exemplary GUI displaying the alternate path, according to at least one embodiment.

FIG. 8 illustrates an exemplary user-selected rerouted path displayed within a GUI 500, in accordance with embodiments of the present disclosure. The GUI may be displaying an alternate path 504 that may have the user traverse street 802, street 804, street 512, and street 514, all of which may not have the user stopping at a red light.

It may be appreciated that FIGS. 2-8 provide only an illustration of some embodiments and do not imply any limitations with regard to how different embodiments may be implemented. Many modifications to the depicted embodiment(s) may be made based on design and implementation requirements.

A traffic route based on traffic data (e.g., data relating to the timing of stop lights, the geographic location of vehicles in a nearby proximity to a vehicle that a user may be located within, etc.) and event data (e.g., data relating to users populating music shows, theaters, nearby restaurants, museums, parades, or the like) may be dynamically determined. A user input (e.g., that might include user preferences that were stored in a data repository from previously received user input) that includes a final destination may be received. One or more available paths that satisfy a user criterion (e.g., a departing time; arrival time; user pace preference; mode of transportation, such as bicycle, walking, vehicle, flight, and the like; etc.) may be determined by utilizing mapping data. The one or more available paths may be displayed within an electronic device (e.g., a laptop, tablet, smart device, desktop computer, or the like). A user selection (e.g., oral selection, touch selection, or the like) of a desired path of the one or more available paths may be displayed. The user-selected desired path may be displayed within a user interface (UI). Traffic data and user data may be monitored. A routing event (e.g., a change in the user's pace, large crowds, events, sports games, a change in a traffic light, and deviation in the user's path) may be determined based on monitoring the traffic data and the user data. One or more new paths that satisfy the user criteria may be generated, based on the monitored traffic data and user data. A user may be prompted to select one of the one or more generated new paths. A user selection of at least one of the one or more generated new paths may be received.

A notification within the UI of the electronic device indicating that the user may be stopped by the routing event may be displayed. User input that indicates that the user would like to be rerouted may be received. The user selected new path may be displayed within the UI. Traffic data along the selected desired path may be accessed. A start time for the user to begin along the desired path may be determined. The user may be determined to have begun along the desired path. Both traffic data and user data are updated. A user pace is determined. The user criteria may comprise a list that includes restaurants, museums, and historical landmarks that the user prefers to encounter along the selected new path. The user selection of the new path may be in the form of a touch selection. The received user input may be stored in a data repository for future use. The data repository (e.g., database 114) may be searched for selections to add to the user criteria.

Figure 9:
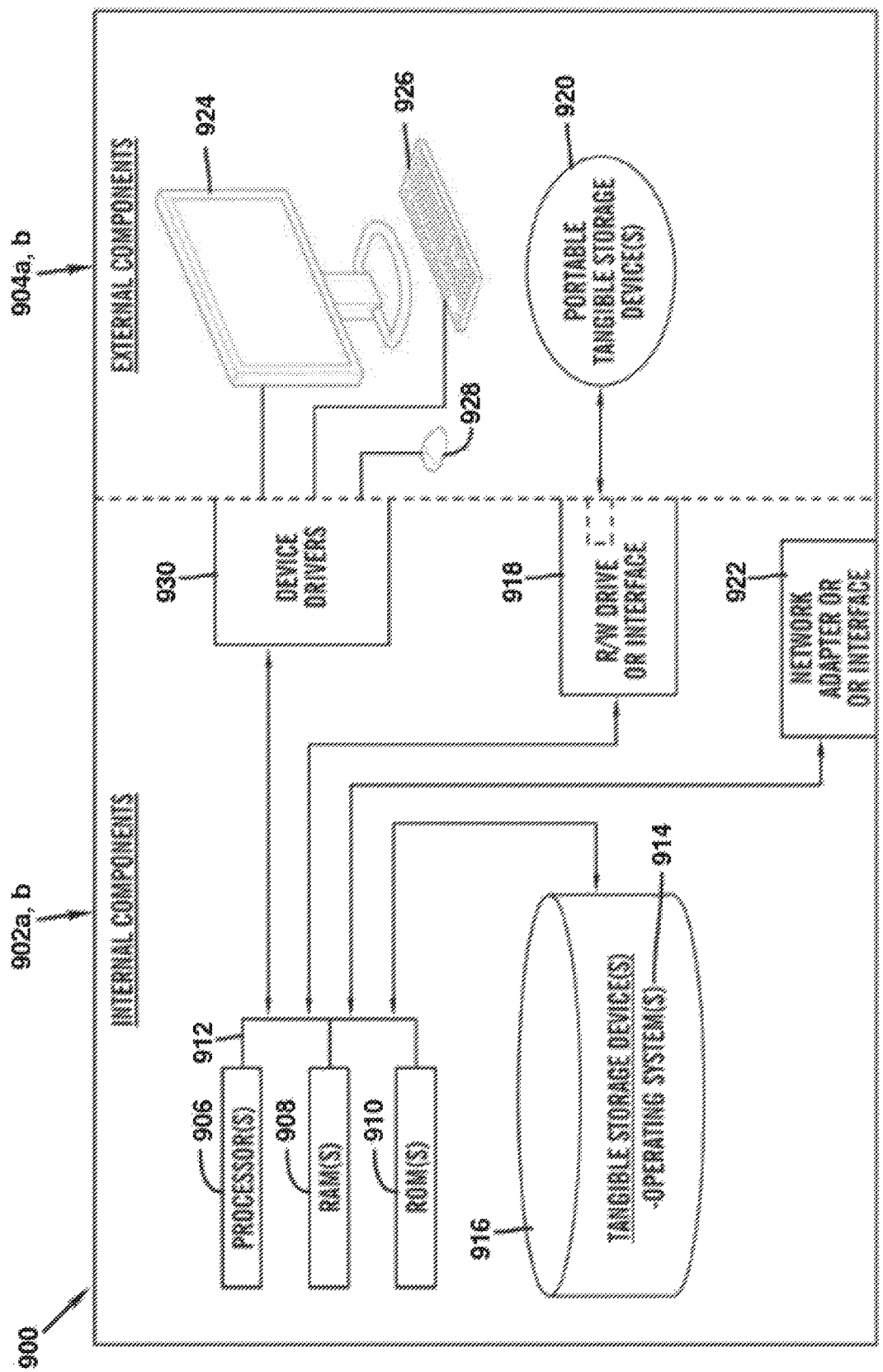
FIG. 9 is a block diagram of internal and external components of computers and servers depicted in FIG. 1 according to at least one embodiment.

FIG. 9 is a block diagram 900 of internal and external components of computers depicted in FIG. 1 in accordance with an illustrative embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 902*a, b*, and 904*a, b* is representative of any electronic device capable of executing machine-readable program instructions. Data processing system 902*a, b*, and 904*a, b* may be representative of a smart phone, a computer system, PDA, or other electronic devices. Examples of computing systems, environments, and/or configurations that may represented by data processing system 902*a, b*, and, 904*a, b* include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 may include respective sets of internal components 902 *a, b* and external components 904 *a, b* illustrated in FIG. 9. Each of the sets of internal components 902 *a, b* includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 and the Traffic navigation program 110 in client computer 102 in network server 112 (FIG. 1), may be stored on one or more computer-readable tangible storage devices 916 for execution by one or more processors 906 via one or more RAMs 908 (which typically include cache memory). In the embodiment illustrated in FIG. 9, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the Traffic navigation program 110 can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the Traffic navigation program 110 in client computer 102 in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the traffic navigation program 110 in client computer 102 in network server computer 112 are loaded into the respective hard drive 916. The network may comprise copper wires, optical fibers, wireless transmission, routers, firewalls, switches, gateway computers, and/or edge servers.

Each of the sets of external components 904a, b can include a computing device 924 that may be a mobile device (e.g., tablet, smart phone, laptop, etc.) or any computing device with an integrated touch screen capable of receiving user input as described in the present disclosure, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computing device 924, keyboard 926 and computer mouse 928. The device drivers 930, R/W drive or interface 918 and network adapter or interface 922 comprise hardware and software (stored in tangible storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
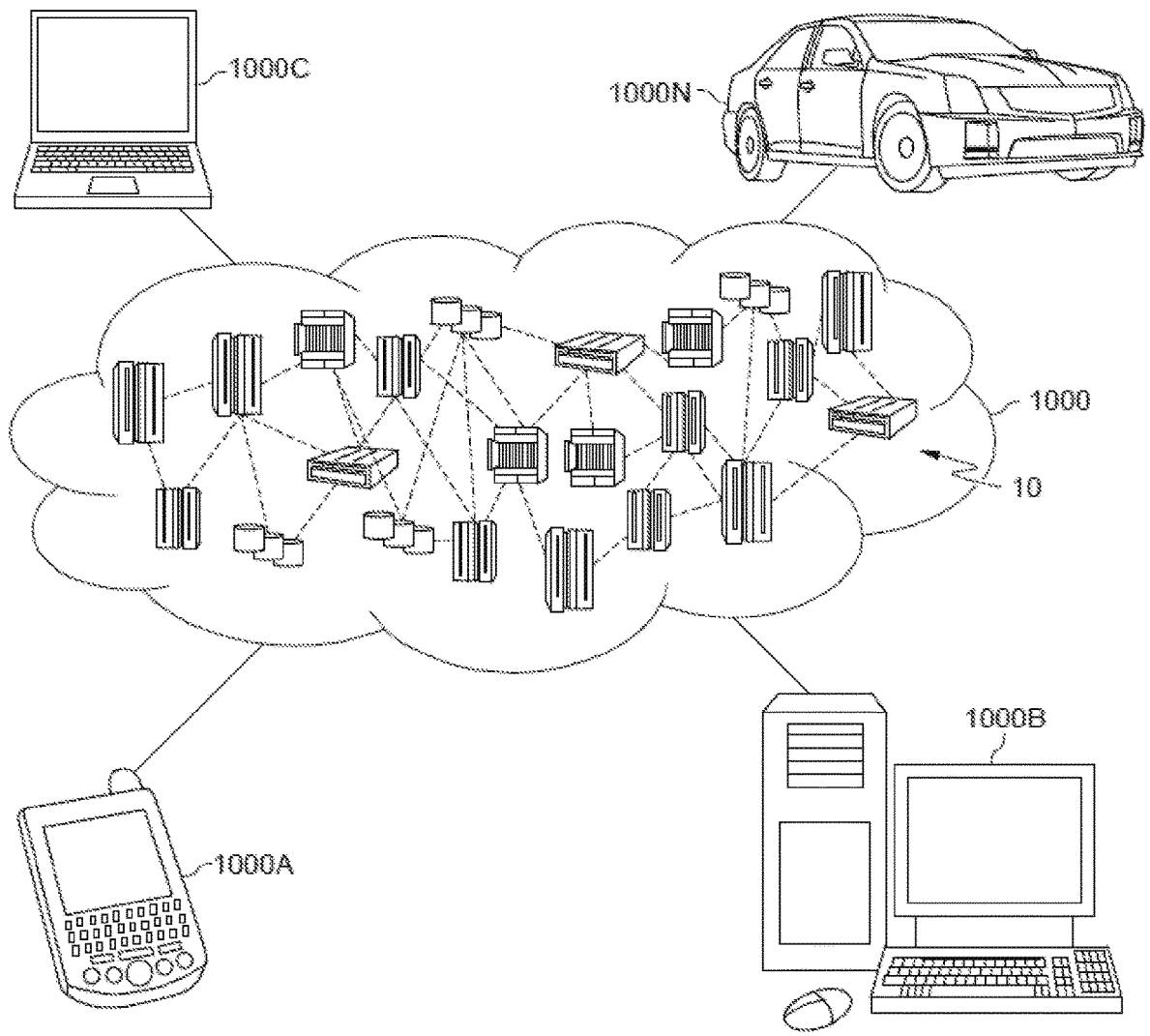
FIG. 10 is a block diagram of an illustrative cloud computing environment including the computer system depicted in FIG. 1, in accordance with an embodiment of the present disclosure.

Referring now to FIG. 10, illustrative cloud computing environment 1000 is depicted. As shown, cloud computing environment 1000 comprises one or more cloud computing nodes 10 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 10 are intended to be illustrative only and that computing nodes 10 and cloud computing environment 1000 can communicate with any type of computerized device over any type of network and/or network addressable connection (e.g., using a web browser).

Figure 11:
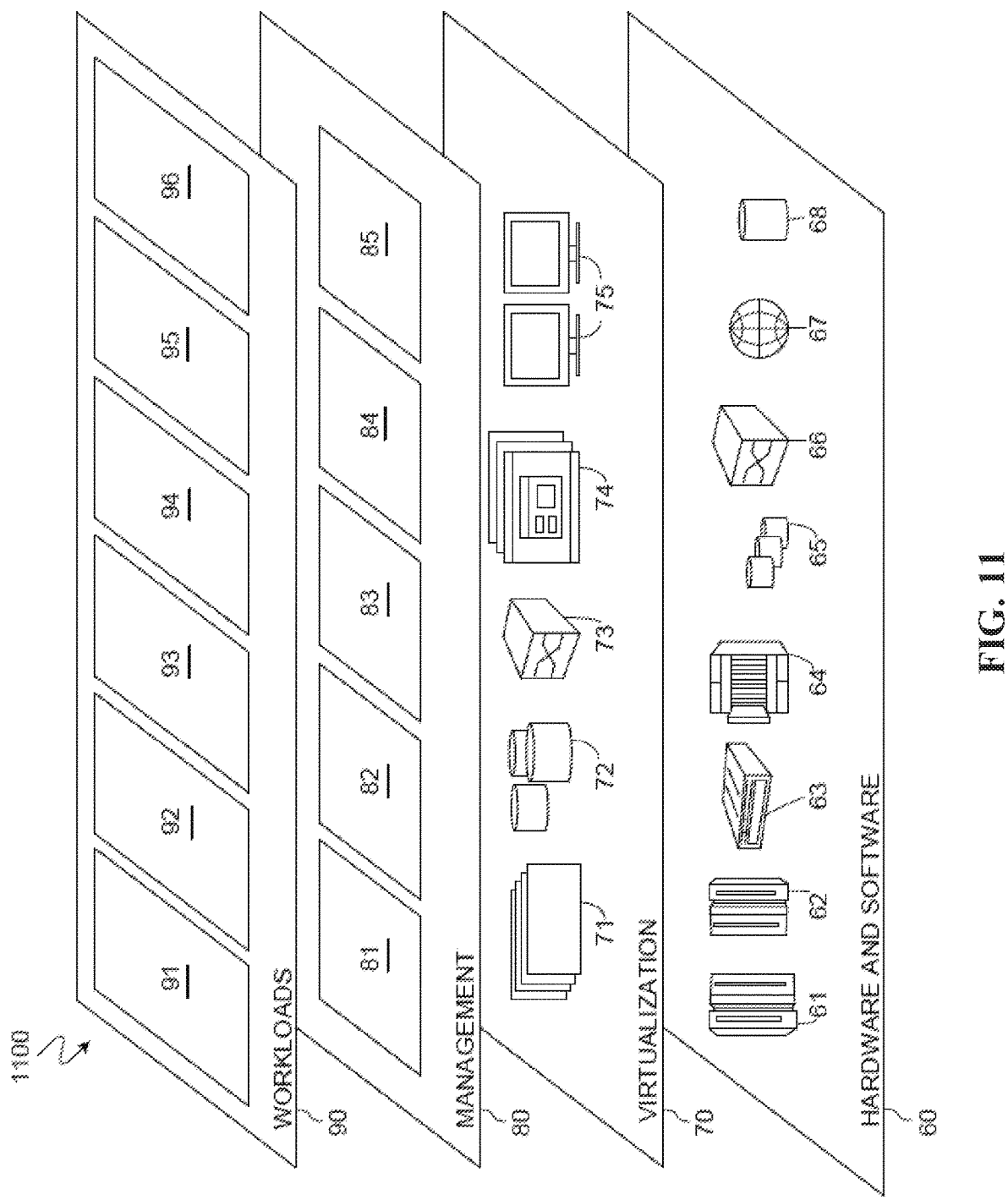
FIG. 11 is a block diagram of functional layers of the illustrative cloud computing environment of FIG. 10, in accordance with an embodiment of the present disclosure.

Referring now to FIG. 11, a set of functional abstraction layers 1100 provided by cloud computing environment 1000 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and traffic navigation program 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method for dynamically determining a pedestrian route based on traffic data comprising:
   receiving, from a user, a user input that includes a final destination and a goal pace and one or more user criteria;
   determining one or more available pedestrian paths, by utilizing mapping data, that satisfy the one or more user criteria;
   displaying the one or more available pedestrian paths within an electronic device;
   receiving a user selection of a desired pedestrian path of the one or more available pedestrian paths;
   displaying the user-selected desired pedestrian path within a user interface (UI);
   monitoring traffic data along the user-selected desired pedestrian path and user data, wherein the traffic data includes a determined color of a traffic light on the desired pedestrian path;
   detecting a routing event based on monitoring the traffic data and the user data such as the goal pace;
   generating, in response to detecting the routing event, one or more new pedestrian paths that satisfy the one or more user criteria based on the monitored traffic data and user data;
   prompting the user to select one of the one or more generated new pedestrian paths; and
   receiving a user selection of at least one of the one or more generated new pedestrian paths.

2. The method of claim 1, further comprising:
   displaying a notification within the UI of the electronic device indicating that the user will be stopped by the routing event;
   receiving user input that indicates that the user would like to be rerouted; and
   displaying the user selected new pedestrian path within the UI.

3. The method of claim 2, further comprising:
   accessing traffic data along the selected new pedestrian path;
   determining a start time for the user to begin along the selected new pedestrian path;
   determining that the user is beginning along the selected new pedestrian path;
   updating both traffic data and user data; and
   determining a user pace.

4. The method of claim 3, wherein the routing event includes one or more selected from a group consisting of a change in the user pace, large crowds, events, sports games, a change in the traffic light, and deviation in the selected new pedestrian path.

5. The method of claim 1, wherein the one or more user criteria comprise a list that includes restaurants, museums, and historical landmarks that the user prefers to encounter along the selected new pedestrian path.

6. The method of claim 1, further comprising:
storing the received user input in a data repository for future use; and
searching the data repository for selections to add to the user criteria.

7. The method of claim 1, wherein the user selection of the new pedestrian path is in the form of a touch selection, and wherein traffic data is data from one or more vehicles and pedestrians along the selected new pedestrian path.

8. A computer system for dynamically determining a pedestrian route based on traffic data, the computer system comprising:
one or more processors and one or more computer-readable memories containing program instructions that, when executed by at least one of the one or more processors, cause the computer system to:
receive, from a user, a user input that includes a final destination and a goal pace and one or more user criteria;
determine one or more available pedestrian paths, by utilizing mapping data, that satisfy the one or more user criteria;
display the one or more available pedestrian paths within an electronic device;
receive a user selection of a desired pedestrian path of the one or more available pedestrian paths;
display the user-selected desired pedestrian path within a user interface (UI);
monitor traffic data along the user-selected desired pedestrian path and user data, wherein the traffic data includes a determined color of a traffic light on the desired pedestrian path;
detect a routing event based on monitoring the traffic data and the user data such as the goal pace;
generate, in response to detecting the routing event, one or more new pedestrian paths that satisfy the one or more user criteria based on the monitored traffic data and user data;
prompt the user to select one of the one or more generated new pedestrian paths; and
receive a user selection of at least one of the one or more generated new pedestrian paths.

9. The computer system of claim 8, further comprising:
displaying a notification within the UI of the electronic device indicating that the user will be stopped by the routing event;
receiving user input that indicates that the user would like to be rerouted; and
displaying the user selected new pedestrian path within the UI.

10. The computer system of claim 9, further comprising:
accessing traffic data along the selected new pedestrian path;
determining a start time for the user to begin along the selected new pedestrian path;
determining that the user is beginning along the selected new pedestrian path;
updating both traffic data and user data; and
determining a user pace.

11. The computer system of claim 10, wherein the routing event includes one or more selected from a group consisting of a change in the user pace, large crowds, events, sports games, a change in the traffic light, and deviation in the selected new pedestrian path.

12. The computer system of claim 8, wherein the one or more user criteria comprise a list that includes restaurants, museums, and historical landmarks that the user prefers to encounter along the selected new pedestrian path.

13. The computer system of claim 8, further comprising:
storing the received user input in a data repository for future use; and
searching the data repository for selections to add to the one or more user criteria.

14. The computer system of claim 8, wherein the user selection of the new pedestrian path is in the form of a touch selection, and wherein traffic data is data from one or more vehicles and pedestrians along the selected new pedestrian path.

15. A computer program product for dynamically displaying a data structure within a graphical user interface, the computer program product comprising
computer-readable storage media having program instructions embodied therewith, the program instructions executable by a computer to cause the computer to:
receive, from a user, a user input that includes a final destination and a goal pace and one or more user criteria;
determine one or more available pedestrian paths, by utilizing mapping data, that satisfy the one or more user criteria;
display the one or more available pedestrian paths within an electronic device;
receive a user selection of a desired pedestrian path of the one or more available pedestrian paths;
display the user-selected desired pedestrian path within a user interface (UI);
monitor traffic data along the user-selected desired pedestrian path and user data;
detect a routing event based on monitoring the traffic data and the user data such as the goal pace, wherein the traffic data includes a determined color of a traffic light on the desired pedestrian path;
generate, in response to detecting the routing event, one or more new pedestrian paths that satisfy the one or more user criteria based on the monitored traffic data and user data;
prompt the user to select one of the one or more generated new pedestrian paths; and
receive a user selection of at least one of the one or more generated new pedestrian paths.

16. The computer program product of claim 15, further comprising:
program instructions to display a notification within the UI of the electronic device indicating that the user will be stopped by the routing event;
program instructions to receive user input that indicates that the user would like to be rerouted; and
program instructions to display the user selected new pedestrian path within the UI.

17. The computer program product of claim 16, further comprising:
program instructions to access traffic data along the selected new pedestrian path;
program instructions to determine a start time for the user to begin along the selected new pedestrian path;

program instructions to determine that the user is beginning along the selected new pedestrian path;

program instructions to update both traffic data and user data; and program instructions to determine a user pace.

18. The computer program product of claim 17, wherein the routing event includes one or more selected from a group consisting of a change in the user pace, large crowds, events, sports games, a change in the traffic light, and deviation in the selected new pedestrian path, and wherein the user criteria comprise a list that includes restaurants, museums, and historical landmarks that the user prefers to encounter along the selected new pedestrian path.

19. The computer program product of claim 15, further comprising:

program instructions to store the received user input in a data repository for future use; and program instructions to search the data repository for selections to add to the one or more user criteria.

20. The computer program product of claim 15, wherein the user selection of the new pedestrian path is in the form of a touch selection, and wherein traffic data is data from one or more vehicles and pedestrians along the selected new pedestrian path.

* * * * *